Patented Jan. 31, 1933

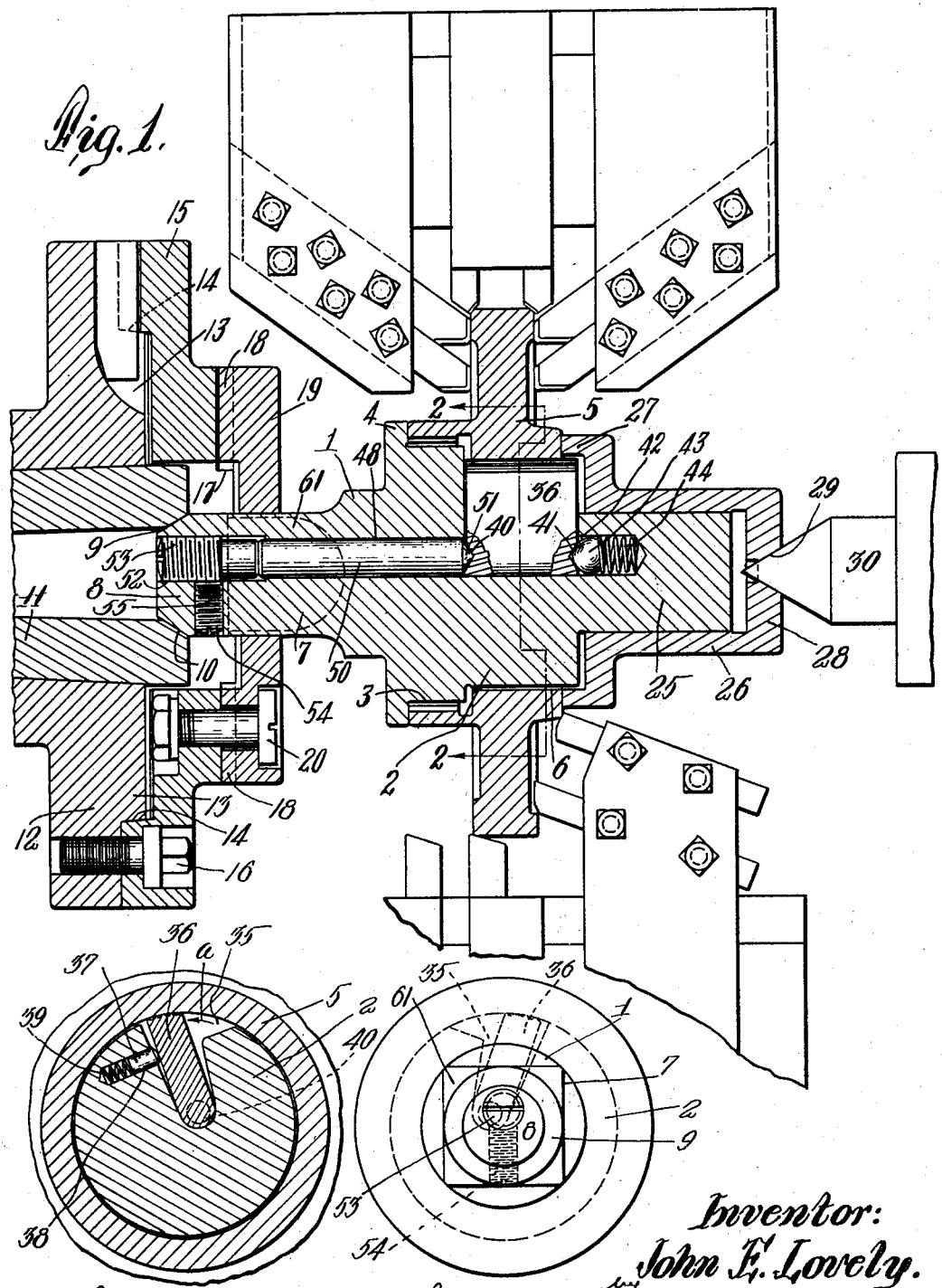

1,895,807

UNITED STATES PATENT OFFICE

JOHN E. LOVELY, OF SPRINGFIELD, VERMONT, ASSIGNOR TO JONES & LAMSON MACHINE COMPANY, OF SPRINGFIELD, VERMONT, A CORPORATION OF VERMONT

INTERNAL DRIVING FIXTURE

Application filed April 8, 1930. Serial No. 442,561.

This invention relates to work driving means for lathes and the like by which the work is rotated with a spindle and has for an object to provide such a device which engages the work inside of a bore therein, thus leaving the external surface free for machining operations. To this end the fixture has a hub portion over which the work is placed, this hub portion having an eccentrically pivoted jaw which in normal driving direction of the fixture automatically wedges against the inner face of the work and so holds the work against rotation relative to the hub portion of the fixture. The fixture may also be provided with means for correctly locating the work prior to its driving engagement.

For a more complete understanding of this invention, reference may be had to the accompanying drawing in which Figure 1 is a central longitudinal section through the fixture and work and certain parts of the work spindle.

Figure 2 is a section on line 2—2 of Figure 1.

Figure 3 is an end elevation of the fixture.

As shown in the drawing the fixture comprises a body member 1 having a hub portion 2. At one end this hub portion is provided with a portion of larger diameter as at 3 having a shoulder portion 4 which serves as an abutment against which the work 5 may be placed. This work 5, as shown, is provided with a central opening 6 which provides a surface for engagement by the driving fixture so that substantially the entire external surface of the work is free for machining operations. The body portion 1 is provided at one end with an extension 61, which as shown best in Figure 3, is provided with a squared portion 7 outwardly of which it has a portion of cylindrical contour 8 terminating in a conical bevel 9. This bevel portion 9 is formed to engage a mating flared face 10 of a spindle 11 which has fixed thereto a nose member 12 having a central projecting boss 13 provided with a tapering external face 14. A face plate 15 having a mating tapered socket fits over the tapered portion 13 and may be fixed to the face plate as by means of bolts such as 16. This plate 15 is provided with a transverse groove 17 within which ride ribs 18 on the inner face of a driving plate 19 which has a squared hole to receive the squared portion 7 of the fixture and thus as the spindle rotates to transmit driving rotation to the fixture. The plate 19 may be fixed to the plate 15 as by bolts such as 20.

The opposite end portion of the body is provided with a central extension 25 on which is slidably mounted a work retaining member 26. This member is formed substantially cup shaped, being provided with an annular flange 27 at its large end which abuts a face of the work 5 and holds it against the shoulder portion 4. The member 26 as shown is somewhat longer than the extension 25 and is provided with a closed end 28 having a central socket opening 29 to receive the point of a lathe center 30 which will commonly be the center of the lathe tailstock. Pressure of the tailstock center on this member 26 acts to hold the work firmly against the shoulder 4 and also to hold the tapered portion 9 of the fixture against the seat 10 of the spindle.

The hub portion 2, as shown best in Figure 2, is provided with a recess 35 within which is pivotally mounted a work-engaging jaw 36. The pivotal mounting of this jaw is eccentric to the axis of the body member so that by rocking this jaw on its fulcrum its outer end may be caused to approach or recede from the inner face of the bore of the work. It is normally held continuously pressed outwardly against the work as by means of a plug 37 seated in a socket 38 and pressed outwardly against the jaw 36 as by means of a spring 39.

The means for fulcruming the jaw 36 are best shown in Figure 1. Referring to this figure, it will be seen that opposite ends of the jaw 36 are provided with alined conical depressions 40 and 41. The body portion is provided at one side of the recess 35 with a socket portion 42 within which is positioned a ball 43 seated against a spring 44. This ball is adapted to engage in the depression 41 of the jaw and acts as a latch to hold the jaw in position after it has been inserted, the ball snapping into the depression 41. It also serves as a fulcrum element for this jaw. The body also is provided with an elongated opening 48 communicating with the socket at one end and extending through the portions 61 and 8 of the body. Slidable within this opening is a rod 50 having a conical inner end 51 engageable in the depression 40. This rod 50 is adjustable from and to engagement with the jaw and when in engagement therewith acts to hold the jaw within the hub socket and also acts as a fulcrum member therefor cooperating with the ball 42 with which it is in axial alinement. The other end portion of the opening 48 is shown as threaded as at 52 to receive an externally threaded plug 53, the inner end of which bears against the outer end of the rod 50 and holds it from retracting out of contact with the jaw 36. This plug 53 may be held in adjusted position as by means of a set screw 54 threaded through an opening 55 extending radially within the portion 8. The jaw member 36 is so positioned that in the normal direction of rotation of the fixture, as shown by the arrow $a$ in Figure 2, its outer end tends to wedge against the inner face of the work, thus clamping the work on the hub portion. By a slight rocking motion given to the work in the same direction when the spindle is stationary, the work is freed from the body portion and jaw and may be readily withdrawn after the member 26 has been removed.

From the foregoing description of an embodiment of this invention, it should be evident to those skilled in the art that various changes and modifications might be made without departing from the spirit or scope of this invention as defined by the appended claims.

I claim:

1. A fixture comprising a body having a portion over which work may be placed, said body having a recess, a work engaging jaw in said recess, a spring pressed fulcrum element releasably securing said jaw in said recess with capability of limited pivotal movement about an axis eccentric to said body portion into and out of engagement with work on said portion, a fulcrum member engageable with said jaw opposite to said element, and means for fixing said member in position.

2. A fixture comprising a body having a portion over which work may be placed, said portion having a recess and an opening extending from one end portion of said body eccentric to its axis and communicating with said recess and having a socket in the opposite wall of said recess in alinement with said opening, a work engaging jaw in said recess, said jaw having oppositely disposed depressions, a spring pressed fulcrum element seated in said socket and engaging in one of said depressions, a fulcrum member slidably engaging in said opening and adjustable to engage in the other of said depressions, and means for holding said member in such position.

In testimony whereof I have affixed my signature.

JOHN E. LOVELY.